United States Patent

Livshiz et al.

[11] Patent Number: 5,740,045
[45] Date of Patent: Apr. 14, 1998

[54] PREDICTIVE SPARK CONTROLLER

[75] Inventors: Mike Livshiz, Southfield; David Jeffrey Sanvido, Novi, both of Mich.

[73] Assignee: General Motors Corporation, Detroit, Mich.

[21] Appl. No.: 556,548

[22] Filed: Nov. 29, 1995

[51] Int. Cl.[6] .................. F02D 43/00; F02P 5/04
[52] U.S. Cl. .................. 364/431.03; 364/431.051; 364/431.053; 364/431.07; 123/339.19; 123/352
[58] Field of Search .................. 364/431.03, 431.04, 364/431.051, 431.053, 431.07; 123/339.11, 339.14, 339.19, 352, 414, 412, 419, 422; 477/102, 107

[56] References Cited

U.S. PATENT DOCUMENTS

| | | | |
|---|---|---|---|
| 4,449,501 | 5/1984 | Greeves | 123/425 |
| 4,881,512 | 11/1989 | Erskine et al. | 123/628 |
| 4,893,244 | 1/1990 | Tang et al. | 364/431.03 |
| 4,926,335 | 5/1990 | Flowers et al. | 364/431.051 |
| 5,291,409 | 3/1994 | Richardson et al. | 364/431.07 |
| 5,385,516 | 1/1995 | Grange et al. | 477/107 |
| 5,497,329 | 3/1996 | Tang | 364/431.052 |

*Primary Examiner*—Kevin J. Teska
*Assistant Examiner*—Tan Nguyen
*Attorney, Agent, or Firm*—Michael J. Bridges

[57] ABSTRACT

Engine speed control through variation in ignition timing of an air-fuel mixture in engine cylinders to vary engine output torque in response to current and predicted future engine speed error includes a proportional-derivative control strategy for damping engine speed oscillations, includes an additive combustion timing offset determined as a function of accessory load status for simplified calibration, and includes control gains determined as a function of a predicted future engine intake manifold absolute air pressure to better predict and compensate engine load changes and determined as a function of predicted future engine speed to stabilize combustion timing.

13 Claims, 4 Drawing Sheets

5,740,045

PREDICTIVE SPARK CONTROLLER

FIELD OF THE INVENTION

This invention relates to automotive internal combustion engine controls and, more particularly, to engine output torque control through variation in engine cylinder ignition timing.

BACKGROUND OF THE INVENTION

Reduction in automotive internal combustion engine emissions and increase in engine fuel economy are desired. Engine control performance, such as engine speed reference tracking and engine load or noise rejection impacts engine emissions and fuel economy. An engine controller can improve its potential for engine emissions reduction and increased fuel economy by responsively tracking engine speed references or by rejecting load disturbances and noise. Limited improvement in load rejection and reference tracking has been provided through ignition timing (also referred to as combustion timing) control for calculating minimum spark advance for best torque MBT ignition timing in response to predicted engine speed, as proposed in U.S. Pat. No. 4,893,244, assigned to the assignee of this application. Additionally, limited improvement in load rejection and reference tracking has been provided through proposals for proportional feedback control for stabilizing ignition (combustion) timing. Such limited improvements may be insufficient to meet aggressive emissions and fuel economy requirements.

An engine controller providing for significantly improved load rejection and reference tracking over that of the prior art would therefore be desirable.

SUMMARY OF THE INVENTION

The present invention is a desirable engine controller in which engine cylinder ignition timing provides for improved rejection of load disturbances and noise and for reference engine speed tracking with minimum tracking error.

More specifically, in accord with an aspect of this invention, an improved estimate of engine load and load disturbance is provided responsive to current and future predicted engine speed and engine intake manifold absolute pressure information, and an MBT ignition timing calculated as a function of the improved estimate. In accord with a further aspect of this invention, an ignition timing stabilizer is provided using proportional-plus-derivative control with predictive engine speed feedback. Control gains are determined as a function of predicted engine speed and predicted engine intake manifold absolute pressure.

In accord with yet a further aspect of this invention, ignition timing authority is varied as a function of auxiliary load information allowing for simplified calibration of accessory loads and eliminating the complexities of feedforward control using idle air controls or electronic throttle controls. More specifically, an ignition (combustion) timing offset is determined as a function of accessory load status and is applied to adjust ignition timing when needed to offset corresponding load disturbances.

BRIEF DESCRIPTION OF THE DRAWINGS

The invention may be best understood by reference to the preferred embodiment and to the drawings in which.

DESCRIPTION OF THE PREFERRED EMBODIMENT

Figure 1:
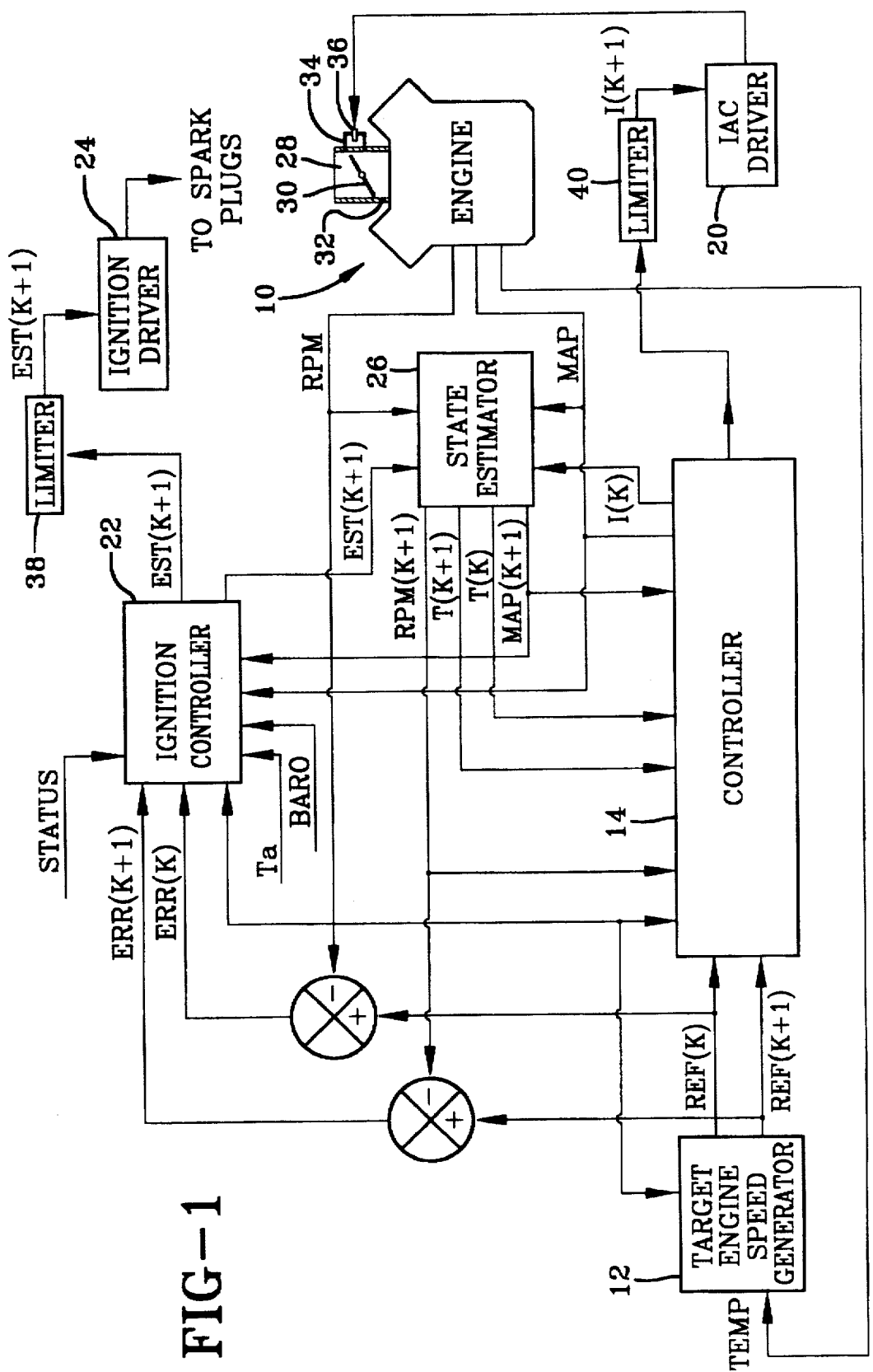
FIG. 1 is a general diagram of the engine speed control structure of the preferred embodiment of this invention.

Referring to FIG. 1, intake air is provided to internal combustion engine 10 via intake air path 28 in which is disposed an inlet air valve 30, which may be a conventional butterfly valve the degree of rotation of which restricts airflow from the intake air path 28 to an intake manifold 32. Engine intake airflow may additionally be provided substantially independent of the positioning of the inlet air valve through an air conduit 34 opening, on a first end, into the intake air path 28 upstream of the valve 30 and opening on a second end into the intake manifold 32 downstream of the valve 30. A precision valve 36, such as a solenoid valve is provided along the bypass conduit 34 between the first and second ends, for controlling the restrictiveness of the conduit to airflow therethrough. The valve 36 is controlled through a drive command applied thereto from an IAC driver 20, which may be a simple conventional drive circuit for converting an digital valve position command value into a drive current level. The position command value is determined to provide for a precise airflow into the engine for fine engine output torque adjustment, for example to provide for smooth, stable engine idle speed control.

In an alternative embodiment in accord with this invention, the bypass conduit 34 and the idle air valve 36 may be eliminated, and precise control of engine inlet air may be provided through known electronic throttle control techniques, for example by directly controlling an actuator coupled to the inlet air valve 30 so as to precisely position the valve in the intake air path and thus provide a high resolution control of engine intake air, for example to meet the exacting requirements of engine idle air control. In such an alternative embodiment, an appropriate drive circuit, for example generally corresponding to the IAC driver 20 is provided to receive the digital position command and convert the command into an analog drive current signal applied to a suitable throttle actuator, such as a DC motor.

The absolute air pressure MAP in intake manifold 32 is sensed by a conventional pressure transducer disposed in the engine intake manifold 32 and provided as output signal MAP. Engine coolant temperature is sensed via a temperature sensor (not shown), such as a conventional thermocouple disposed in an engine coolant circulation path (not shown), and is communicated as output signal TEMP. The engine intake air is received in the manifold and distributed to a plurality of engine cylinders. The intake air is mixed with a delivered fuel quantity, such as may be injected to the intake manifold, to the engine cylinders, or to intake passages upstream of the engine cylinders by one or more conventional fuel injectors to which is provided a pressurized supply of fuel. The air/fuel mixture is ignited in the engine cylinders driving pistons within the cylinders to rotate one or more engine output shafts including a crankshaft (not shown). The rate of rotation of the crankshaft may be transduced by a commercially-available transducer, such as a Hall effect or variable reluctance sensor, positioned to detect passage of teeth or notches circumferentially disposed about the crankshaft, into a periodic engine speed signal RPM. The signal RPM may be substantially sinusoidal, with a frequency representing the rate of passage of the teeth or notches by the transducer. The teeth or notches may be positioned about the circumference of the crankshaft and spaced relative to each other so that each time the periodic signal RPM crosses a predetermined voltage threshold, an engine cylinder event, such as a engine output torque producing event, may be assumed to have occurred.

The control structure of FIG. 1 is provided for engine speed control, including prediction-based spark (ignition) timing control in accord with this embodiment. The spark timing provides a responsive engine output torque control for load disturbance rejection, for increased engine stability through engine output torque damping, and for a more accurate minimum spark advance for best torque command determination incorporating engine load information indicated by current and future predicted manifold absolute pressure.

Specifically in FIG. 1, signals RPM and TEMP are provided to a target engine speed generator 12 which generates, in accord with a predetermined schedule stored in a memory device, a target engine speed REF(K), such as a desired engine idle speed for the present control cycle indicated by index K, and for a next consecutive control cycle REF(K+1), indicated by index K+1. The target engine speeds may be constant speeds, determined in accord with an appropriate engine operating level for idle, such as approximately 700 r.p.m., or may vary in accord with a predetermined schedule, such as an engine warm-up schedule, wherein the engine speed decreases with increasing engine coolant temperature TEMP.

The present target engine speed REF(K) and the predicted target engine speed for the next consecutive control cycle REF(K+1) are communicated as reference inputs to a controller 14 for providing engine control functions, such as including the function described as being carried out by the controllers 14, 16, and 18 of FIG. 1 of the copending U.S. patent application, Ser. No. 08/202,962 filed Feb. 28, 1994, assigned to the assignee of this application and hereby incorporated herein by reference. Generally, the controller structure includes a nested compensation loop structure wherein an outside loop is provided to compensate for rotational dynamic effects and for general disturbances incident on the engine speed control system of this embodiment. The outside loop generates a desired torque command to minimize a difference between the RPM(k) and REF(k) and to minimize a difference between RPM(k+1) and REF (k+1), as described in the incorporated reference. The desired torque command is generated trough application of conventional control techniques, such as classical proportional-plus-integral-plus-derivative control techniques applied to the speed differences.

The compensating torque command TC is provided to an intermediate control loop nested within the described outside control loop. A torque controller within this loop to compensate for fuel delivery and combustion delays in the system. Generally, the torque controller responds to signals T(k) and T(k+1) applied to the controller 14, to minimize a difference between such estimated actual torque and the torque command TC. A conventional control strategy, such as conventional proportional-plus-derivative control strategy, may be provided for this purpose, yielding a desired engine intake air pressure command MC as the intake air manifold pressure required to drive actual torque controllably toward TC. The function of this middle control loop is detailed in the incorporated reference.

The generated command MC is then provided to an inside control loop nested within the middle control loop (and thus within the outside control loop). This inside control loop includes a MAP controller which receives the command MC and receives signal MAP(k+1) from the state estimator 26, and compensates for manifold filling time delays by calculating a desired engine inlet air rate for the next cylinder event in response to the error between the desired MAP value MC and the predicted MAP value MAP(k+1) to command a new engine inlet air rate. The new inlet air rate may be generated by passing the described MAP error term through a conventional compensation function, such as a conventional proportional-plus-derivative control, to arrive at an inlet air rate to properly drive the predicted MAP toward the desired MAP, as is generally known in the art. Further detail of this inside control loop is provided in the incorporated reference.

The MAP controller of the inside loop outputs a desired idle air command I(K) for the present cylinder event, designated by its index K to the state estimator 26, to be described, and outputs a desired idle air command I(K+1) for the next cylinder event designated by index K+1 to a limiter 40, which may be implemented in circuitry or through a control process to provide an upper limit of the magnitude of the idle air command, for example, so the command does not exceed any hardware or bandwidth constraints. The limited command I(k+1) is then applied to IAC driver, such as a conventional drive circuit for generating a drive current at a level substantially corresponding to t he magnitude of the command I(k+1), and for outputting the drive current to the IAC actuator 36 (FIG. 1).

The state estimator 26 of FIG. 1 receives engine parameter information, and provides a prediction of engine states used in accord with this invention. Input information to the state estimator 26 includes signals RPM and MAP, a present idle air command I(K) from controller 14, and present spark timing command EST(K) generated by ignition controller 22, as will be further described. Such input information is used to predict engine speed for the next cylinder event RPM(K+1), engine torque for the current cylinder event T(k) and for the next cylinder event T(K+1), and manifold pressure is predicted for the next cylinder event MAP(K+1). Such prediction may be carried out using any conventional parameter prediction means. Preferably however, the engine speed and torque prediction techniques described in U.S. Pat. No. 5,421,302, assigned to the assignee of this application are to be applied as the portion of the state estimator 26 used to predict RPM(K+1), T(K+1), and T(K). Furthermore, the prediction approach described in the U.S. Pat. No. 5,094,213, assigned to the assignee of this invention, is preferably applied as the portion of the state estimator 26 used to predict MAP (K+1).

Current engine speed error ERR(K) is determined as a difference between the reference engine speed REF(k) and a current sample RPM(K) of the engine speed signal RPM. Predicted engine speed error is determined as a difference between the reference future engine speed REF(K+1) and the predicted engine speed for the next cylinder event RPM(K+1). The error signals ERR(K) and ERR(K+1) are applied to the ignition controller 22. Additionally, signal Ta representing a measured ambient automotive vehicle temperature, such as provided by a conventional temperature sensor positioned on the vehicle to detect ambient air temperature is applied to the ignition controller 22. Still further, a signal BARO, representing ambient barometric pressure, for example as may be provided by a conventional barometric pressure transducer or as may be provided by sampling the signal MAP under engine operating conditions in which the pressure drop across the valve 30 is minimal, is provided to the ignition controller 22. Still further, a status input value stored in controller memory and including a number of flags indicating the status of certain accessory load requests is provided to the ignition controller 22. Each of the flags of the status input value may correspond to one or more accessory loads, indicating whether a request is pending for the corresponding load to be applied. The accessory loads may include air conditioner clutch, automatic transmission shift, and other loads which can be rapidly applied and removed from the engine, wherein such application and removal causes a sudden and significant change in engine output torque margin, affecting engine speed stability, as is generally understood in the art. For example, if the flag of the status input value is set, a request for application of the corresponding accessory load is pending and if the flag is clear, the load may, if necessary, be removed.

The ignition controller 22 provides for engine speed tracking and load rejection through a determination of a minimum best torque ignition timing command responsive to engine speed and to manifold absolute pressure MAP. MAP information provides for an improved modeling of engine load, so that a more accurate MBT calculation may be provided. The ignition controller further provides for determination and application of a spark timing offset as a function of such operating conditions as accessory load status, barometric pressure and ambient temperature. Such provides for compensation of conditions that are difficult to incorporate into spark timing calibration. Further, replaces the feedforward control of idle air and spark timing provided, for example, in the ignition timing approach of the incorporated reference, significantly reducing calibration complexity. Still further, the ignition controller 22 provides predictive spark control with engine speed feedback information and control gains determined as a function of predicted RPM and MAP. The ignition controller 22 combines the determined MBT and predictive spark control information with the timing offset to yield an ignition timing command for a next consecutive engine ignition event EST(k+1) which is output to a limiter, such as may be practiced as conventional command limiting circuitry for limiting the command EST(K+1) to a predetermined command range, so as to provide that the command does not exceed any hardware or bandwidth constraints. The limited command is then passed as a spark advance command for the next cylinder event EST(K+1) to ignition driver 24, which may generate ignition commands for the active one(s) of the engine spark plugs (not shown) and deliver such commands at the engine operating angle dictated by the top dead center position of the next cylinder to have a combustion event advanced in accord with the command EST(k+1).

Figure 2:
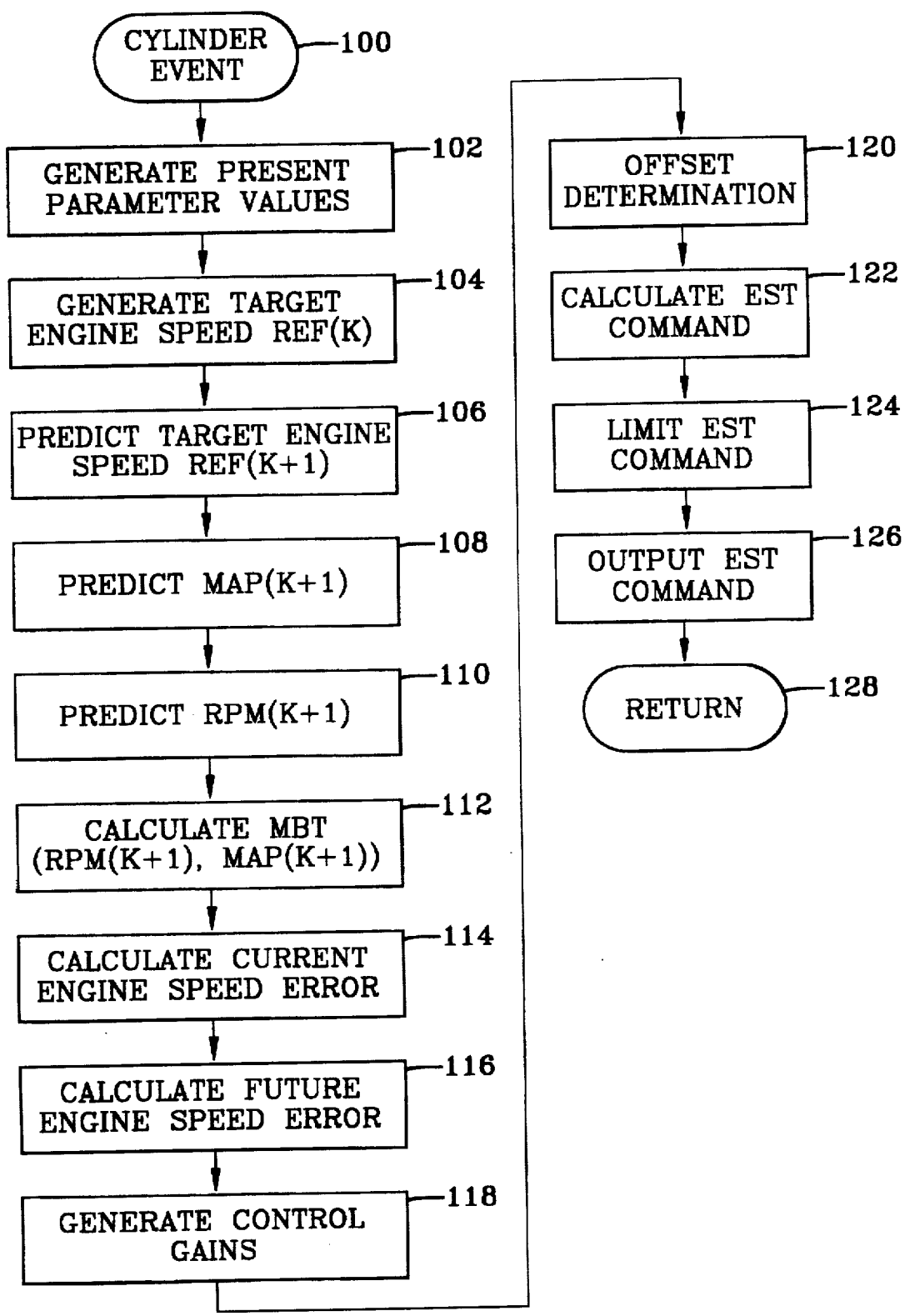
FIGS. 2 and 3 are flowchart diagrams illustrating a flow of operations for carrying out the function of the control structure of FIG. 1.
Figure 3:
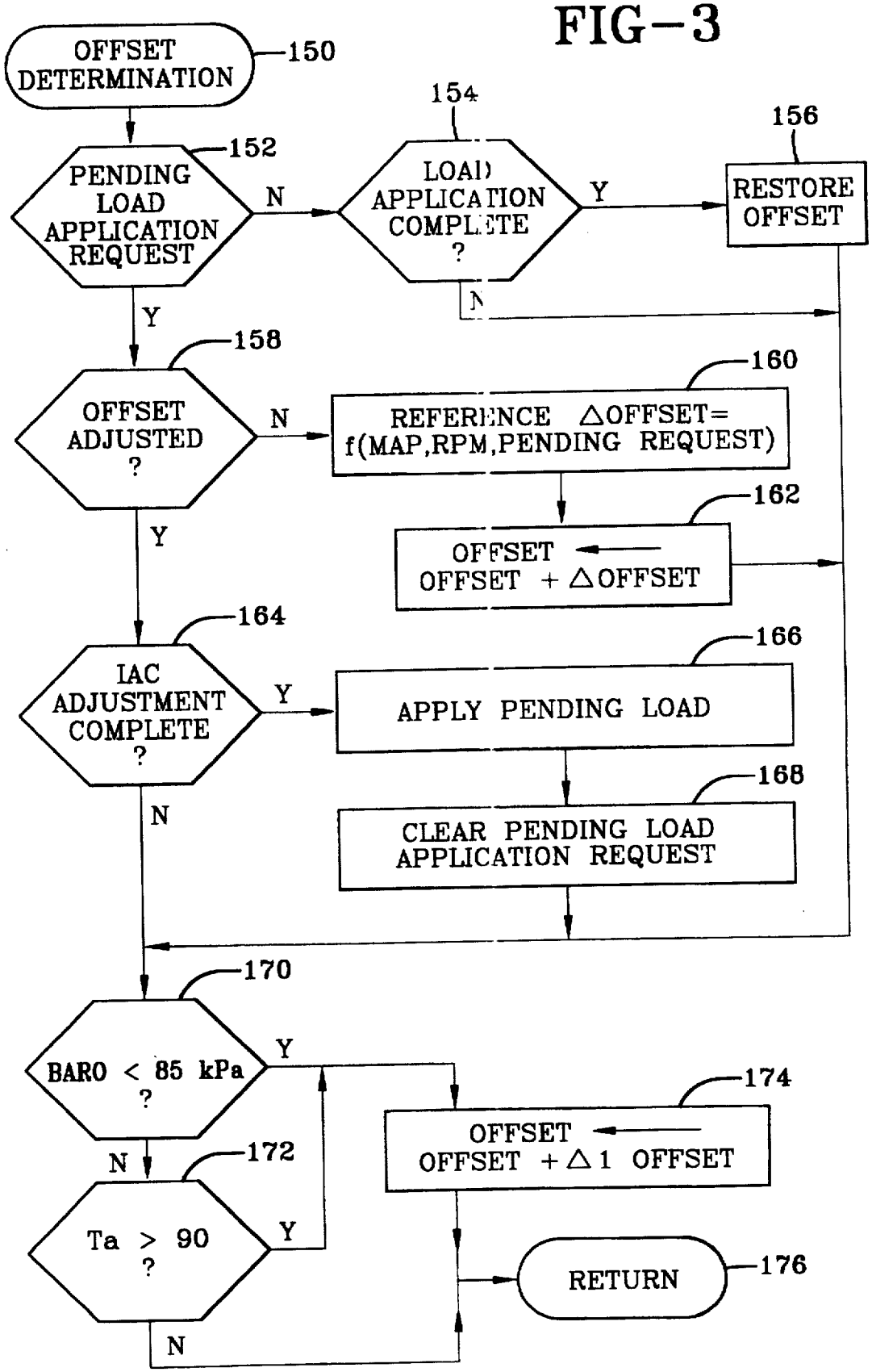

The specific series of operations for carrying out the ignition timing control of the ignition controller 22 are illustrated in FIGS. 2 and 3. The operations of controller 14 for providing IAC command generation are as detailed in FIGS. 2a–3 of the incorporated reference. The operations of the routines of FIGS. 2 and 3 are executed by the ignition controller 22 (FIG. 1) following each engine cylinder event as detected by a voltage reference crossing of signal RPM, as described. Upon the reference voltage crossing, a controller interrupt may be generated, wherein the controller 22 suspends its normal operations and executes the operations of FIG. 2, starting at a step 100 and proceeding to generate present parameter values at a next step 102. The present parameter values include parameters corresponding to the described MAP, TEMP, BARO, and RPM signals.

A target engine reference speed REF(k) for the current or "Kth" engine cylinder event is next generated at a step 104 by the generator 12 of FIG. 1, as described, such as by referencing a reference engine speed from a conventional lookup table stored in non-volatile controller memory as a function of engine coolant temperature. As the engine coolant temperature increases, the reference speed may decrease to about 700 r.p.m. for a fully warmed up engine. The relationship between engine coolant temperature and reference engine speed may be determined for an engine application through a conventional calibration process, and the relationship stored in the form of a lookup table.

A target reference speed REF(k+1) is next predicted at a step 106 as the desired engine speed for the next ("k+1th") consecutive engine cylinder event. REF(k+1) may be generated in the manner described for REF(k), for example by referencing REF(k+1) from a stored lookup table as a function of engine coolant temperature. A prediction of manifold absolute pressure at a next subsequent engine cylinder event, designated MAP(k+1) is next provided at a step 108, for example using the state prediction approach of U.S. Pat. No. 5,094,213, assigned to the assignee of this application, applied to manifold pressure prediction.

The routine of FIG. 2a moves to a step 110, to predict engine speed RPM(K+1) at the next cylinder event. Such prediction is made in this embodiment through application of the prediction techniques detailed in U.S. Pat. No. 5,421,302, assigned to the assignee of this application.

Figure 4:
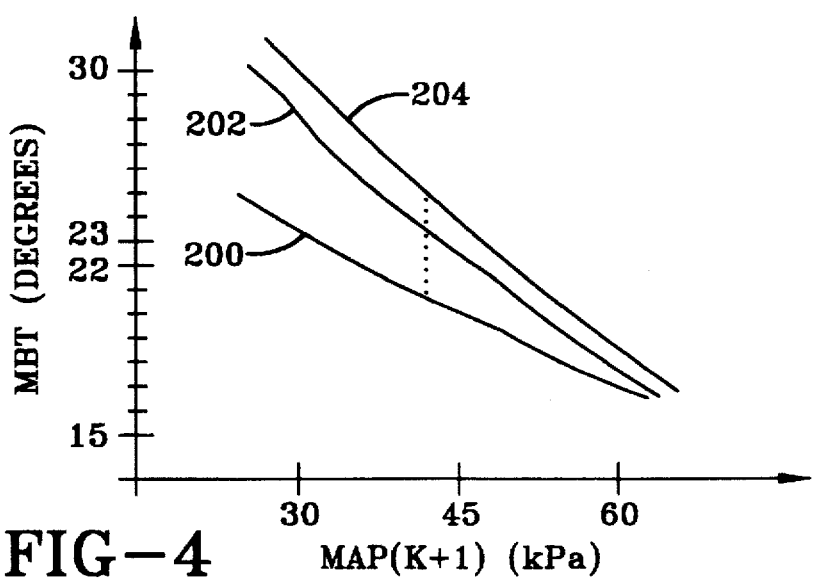
FIGS. 4-6 are graphical diagrams illustrating variation in representative spark timing parameters, referenced and applied through the operations of FIGS. 2 and 3, with varying engine intake manifold absolute pressure.

A minimum spark advance for best torque MBT spark timing command for the next consecutive engine cylinder event is next generated at a step 112 as a predetermined function of RPM(k+1) and MAP(k+1). The MAP and RPM prediction leads is used to estimate engine mechanical load at the next consecutive engine cylinder event, leading to an improved MBT calculation. The relationship between predicted MAP and RPM and MBT spark timing may be generated through a conventional calibration process and stored in the form of a conventional lookup table in non-volatile memory. For example, the relationship of curves 200–204 of FIG. 4 illustrates such calibrated relationships. Curve 200 represents the variation in MBT timing, expressed in angular degrees, of MBT spark timing as a function of MAP(k+1) for an engine speed of about 500 r.p.m. Curve 202 represents the variation in MBT timing, expressed in angular degrees, of MBT spark timing as a function of MAP(k+1) for an engine speed of about 700 r.p.m. Curve 204 represents the variation in MBT timing, expressed in angular degrees, of MBT spark timing as a function of MAP(k+1) for an engine speed of about 900 r.p.m. The MBT value may be referenced from the lookup table using standard interpolation techniques as the MBT spark timing corresponding to the lookup values MAP(k+1) and RPM(k+1).

Figure 5:
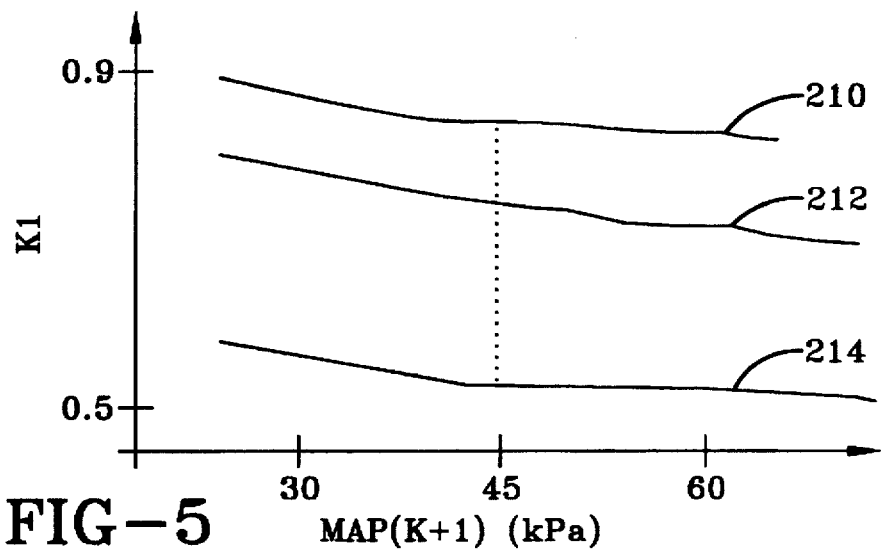

Returning to FIG. 2, present engine speed error ERR(k) is next generated at a step 114 as a difference between REF(k) and RPM(k). A future engine speed error ERR(k+1) is next calculated at step 116 as a difference between REF(k+1) and RPM(k+1) as the deviation in engine speed away from the reference or target engine speed that is predicted to be present for the current engine operating conditions and predicted future engine operating conditions. Control gains K1 and K2 are next referenced at a step 118 as a calibrated function of predicted MAP and RPM values. Gain K1 is a proportional gain in this embodiment applied directly to the error term in a determination of a compensating spark timing command in a proportional control procedure. FIG. 5 illustrates a family of representative calibration curves expressing K1 as a function of MAP(k+1) and RPM(k+1). Specifically, curve 210 illustrates a representative calibration of K1 as a function of varying MAP(k+1) for an predicted engine speed RPM(k+1) of about 500 r.p.m. Curve 212 illustrates a representative calibration of K1 as a function of varying MAP(k+1) for an predicted engine speed RPM(k+1) of about 700 r.p.m. Curve 214 illustrates a representative calibration of K1 as a function of varying MAP(k+1) for an predicted engine speed RPM(k+1) of about 900 r.p.m. These calibrated relationships may be stored in the form of lookup tables in ignition controller 22 FIG. 1) non-volatile memory, and K1 may be referenced therefrom through conventional interpolation procedures as the gain values for the predicted RPM(k+1) and MAP(k+1).

Figure 6:
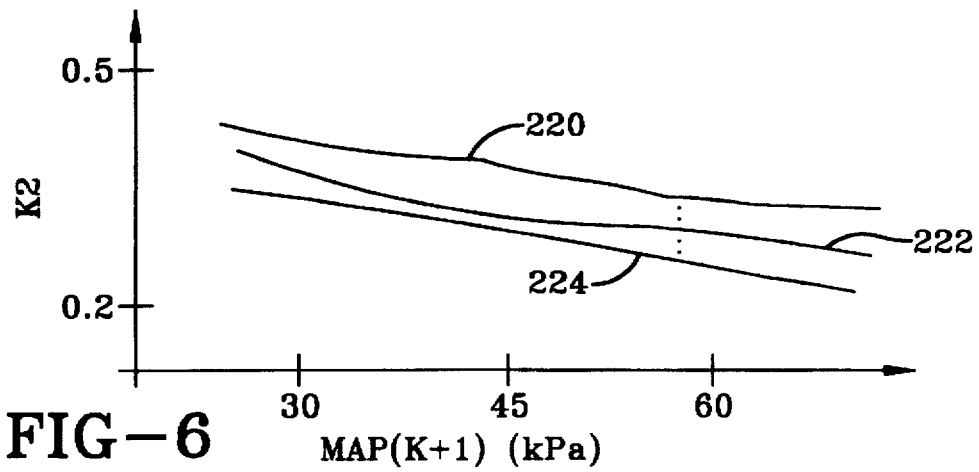

Likewise, gain K2 is an derivative gain in this embodiment applied to a derivative of the predicted and current error terms in a determination of a compensating spark timing command through a derivative control procedure. FIG. 6 illustrates a family of representative calibration curves expressing K2 as a function of MAP(k+1) and RPM(k+1). Specifically, curve 220 illustrates a representative calibration of K2 as a function of varying MAP(k+1) for an predicted engine speed RPM(k+1) of about 500 r.p.m. Curve 222 illustrates a representative calibration of K2 as a function of varying MAP(k+1) for an predicted engine speed RPM(k+1) of about 700 r.p.m. Curve 224 illustrates a representative calibration of K2 as a function of varying MAP(k+1) for an predicted engine speed RPM(k+1) of about 900 r.p.m. These calibrated relationships may be stored in the form of lookup tables in ignition controller 22 (FIG. 1) non-volatile memory, and K2 may be referenced therefrom through conventional interpolation procedures as the gain values for the predicted RPM(k+1) and MAP(k+1).

Returning to FIG. 2, an offset determination routine is next initiated at a step 120. The offset determination routine returns an ignition timing offset provided to reject transient load variations and to increase engine speed stability, avoiding feedforward control of engine intake air rate and its corresponding time-consuming and complex calibration processes.

Specifically, when initiated at the step 120 of FIG. 2, the offset determination routine commences at a step 150 of FIG. 3, and proceeds to determine if any load application request is pending. A storage value maintained in ignition controller 22 (FIG. 1) memory including a number of a load request flags indicates whether certain load change requests have been made, including, for example, a request for engagement of an air conditioner clutch for driving an air conditioning compressor (not shown), a request for a gear change into or out of a non-drive gear such as park or neutral, or any other load change request involving a significant transient engine torque load change. If such any such request is determined to be pending at the step 152, then the load change is delayed while compensating spark timing adjustments are made by determining a compensating load offset term via steps 158–168. If no request is pending at the step 152, a determination of whether a load application is complete is made at a next step 154. A load application is complete when the transient torque change corresponding to a load change request has decayed substantially to zero, and a need for a compensating spark timing offset has likewise been reduced substantially to zero. If any load application is determined to be complete at the step 154, then the change in the spark timing offset to compensate the corresponding load change is removed at a next step 156, to restore the offset to its value prior to the adjustment made to compensate the load change. After restoring the offset, or if the load application is not complete at the step 154, the signal BARO indicating ambient barometric pressure is next compared to a calibrated threshold pressure, of about 85 kPa in this embodiment, at a next step 170. If BARO is less than the threshold at the step 170, then additional ignition timing advance is provided at a next step 174 to increase torque disturbance damping for increased engine speed stability, by adding a calibrated value $\Delta 1$ OFFSET, set in this embodiment to two or three degrees of angular spark timing offset, to the value OFFSET. A step 176 is next executed to return to the routine of FIG. 2, to proceed to the next step 122 thereof, to be described.

If BARO is greater than or equal to the threshold at the step 170, signal Ta indicating current ambient temperature is next compared to a temperature threshold of about 90 degrees Celsius in this embodiment at a next step 172. If ambient temperature exceeds the temperature threshold, the described step 174 adds the calibrated value $\Delta 1$ OFFSET to OFFSET to increase engine output torque damping. Through the steps 170 and 172, compensation for difficult to calibrate conditions of varying altitude or varying vehicle ambient temperature are compensated with minimum calibration, in accord with this invention. After adjusting the offset at the step 174, or if Ta did not exceed the temperature threshold at the step 172, the described step 176 is executed.

Returning to the step 152, if a load application request is pending, it is determined whether an adjustment to OFFSET has been made in response to the request, at a step 158. If no adjustment has yet been made, a value $\Delta$OFFSET is next generated as a function of MAP, RPM, and the pending request at a step 160. For each pending load change request, there is stored an ignition timing offset as a function of engine speed and load as the offset calibrated to adjust engine output torque to allow the corresponding load change to occur without driving engine speed significantly away from the reference engine speed, so that stable engine speed reference tracking with minimum tracking error during transient load change conditions is provided in accord with this invention. The $\Delta$OFFSET values may be generated through a standard calibration process and stored in ignition controller 22 (FIG. 1 in the form of lookup tables with lookup values of engine speed and intake manifold absolute pressure. Values may be referenced from the tables using conventional interpolation techniques. The referenced $\Delta$OFFSET is next applied to the value OFFSET at a step 162 to varying engine ignition timing in response to the request. The described step 170 is next executed.

Returning to the step 158, if the offset has been adjusted for the current pending load change request, such as through execution of the described steps 160 and 162 for the current request, then it is determined whether an idle air control adjustment to the change spark timing offset is complete at a next step 164. This adjustment is complete when the controller 14 of FIG. 1, in accord with the reference incorporated herein, adjusts the command I(k+1) to account for the change in predicted engine output torque resulting from the change in the value OFFSET from the adjustment provided at the step 162. Specifically, the application of the $\Delta$OFFSET value determined at step 158 to ignition timing command EST(k+1) (as will be detailed in FIG. 2) results in a change in estimated engine output torque by state estimator 26 of FIG. 1, resulting in a variation in the command I(k+1), as the controller 14 (FIG. 1) will attempt to stabilize the change in engine output torque. When the process of adjusting the bypass (idle air control) valve 36 is complete, such as when the valve 36 position is stabilized following the change in EST(k+1), a flag in controller memory may be set indicating the adjustment is complete. When that flag is set, as determined at the step 164 of FIG. 3, the load change will be allowed at a next step 166, for example, by setting a flag in controller memory indicating that the application of the pending load change may proceed. The pending load change request is next cleared at a step 168. Next, or if the IAC adjustment is not yet complete as determined at the step 164, the described steps 170–176 are executed to conclude the OFFSET determination operations of FIG. 3.

Returning to FIG. 2, after determining OFFSET at the step 120, an spark timing command EST is calculated at a next step 122 as follows:

$$EST(k+1)=MBT(k+1)-OFFSET+K1*ERR(k+1)+K2*ERR (k).$$

EST(k+1) is next confined to a range defined by upper ignition timing limit MAXEST and lower ignition timing limit MINEST. The range defined by these limits corresponds to ignition timing values that are consistent with a desirable engine fuel economy and acceptable engine speed stability. MAXEST may be set as a fixed value of about forty degrees of retard away from cylinder bottom dead center or may be determined as a function of such parameters as engine speed and engine manifold absolute pressure. MAXEST is set as the maximum spark timing retard that will be tolerated to protect against performance reductions associated with extreme spark timing retard. MINEST may be set as a fixed timing offset below MAXEST, such as a sufficient offset to ensure that a MINEST is about zero degrees, or so that no EST command generated through the routine of FIG. 2 permits an engine cylinder ignition event to occur after the bottom dead center position of the active cylinder. EST(k+1) is limited to MAXEST and MINEST at the step 124, such as by setting EST(k+1) to a limit value if it exceeds that limit value. The limited EST command EST(k+1) is next output to the ignition driver 24 (FIG. 1) at a next step 126. An ignition drive signal will be applied to the next cylinder in the engine cylinder firing order at a time dictated by the command EST(k+1), as is generally understood in the art. After outputting the EST command, the routine of FIG. 2 returns to any further operations that are required, through conventional engine control operations, to fully service the engine cylinder event that initiated the routine such as conventional engine fuel control operations or diagnostic operations, and including any operations of the incorporated reference not supplanted by the operations expressly described in the routines of FIGS. 2 and 3. Upon completion of such additional operations, execution of any operations that were suspended to provide for servicing of the engine cylinder event are resumed.

The preferred embodiment for the purpose of explaining this invention is not to be taken as limiting or restricting this invention since many modifications may be made through the exercise of ordinary skill in the art without departing from the scope of the invention.

The embodiments of the invention in which a property or privilege is claimed are described as follows:

1. In an internal combustion engine receiving intake air in an intake manifold for distribution to at least one engine cylinder having at least one spark plug for igniting, at an ignition timing, a mixture including the intake air and an injected fuel quantity, a method of varying engine output torque through ignition timing control to drive engine speed toward a target engine speed, comprising the steps of:

providing a present target engine speed;
providing a future target engine speed;
predicting future intake manifold air pressure;
sampling present actual engine speed;
predicting a future engine speed;
calculating present engine speed error as a difference between present target engine speed and present actual engine speed;

calculating future engine speed error as a difference between future target engine speed and predicted future engine speed;

referencing a minimum spark advance for best torque ignition timing command (MBT command) as a function of the predicted future engine speed and predicted future intake manifold air pressure;

generating an ignition timing command as a predetermined function of the present and future engine speed errors and of the MBT command; and igniting the mixture at a timing corresponding to the generated ignition timing command to vary engine output torque.

2. The method of claim 1, further comprising the steps of:

for each of a predetermined set of engine auxiliary loads, storing a predetermined spark timing offset value;

establishing whether any of the predetermined set of engine auxiliary loads are in an active state corresponding to load application to the engine;

referencing the stored offset of any of the predetermined set of engine auxiliary loads that is in the active state;

summing the referenced offsets; and reducing the ignition timing command by sum of the referenced offsets.

3. The method of claim 2, further comprising the step of:

establishing whether any of the predetermined set of engine auxiliary loads are in a pending state characterized by incipient application to the engine; and wherein the step of referencing the offset references the offset of any of the predetermined set of engine auxiliary loads that is in the active state and references the offset of any of the predetermined set of engine auxiliary loads that is in the pending state.

4. The method of claim 1, further comprising the steps of:

calculating at least one control gain as a predetermined function of the predicted future engine speed and predicted future intake manifold air pressure; and modifying the calculated future engine speed error by applying the at least one control gain to the calculated future engine speed error; and wherein the generating step generates an ignition timing command as a predetermined function of the present and modified future engine speed errors and of the MBT command.

5. The method of claim 1, further comprising the steps of:

calculating a first control gain as a first predetermined function of the predicted future engine speed and predicted future intake manifold air pressure;

calculating a second control gain as a second predetermined function of the predicted future engine speed and predicted future engine intake manifold air pressure;

providing a proportional engine speed error correction term as a product of the first control gain and the predicted future engine speed error; and providing a derivative engine speed error correction term as a product of the second control gain and the present engine speed error;

and wherein the generating step generates an ignition timing command as a predetermined function of the proportional and the derivative engine speed error correction terms and of the MBT command.

6. The method of claim 5, further comprising the steps of:

for each of a predetermined set of engine auxiliary loads, storing a predetermined spark timing offset value;

establishing whether any of the predetermined set of engine auxiliary loads are in an active state corresponding to load application to the engine;

referencing the stored offset of any of the predetermined set of engine auxiliary loads that is in the active state;

summing the referenced offsets; and reducing the ignition timing command by sum of the referenced offsets.

7. The method of claim 6, further comprising the step of:

establishing whether any of the predetermined set of engine auxiliary loads are in a pending state characterized by incipient application to the engine; and wherein the step of referencing the offset references the offset of any of the predetermined set of engine auxiliary loads that is in the active state and references the offset of any of the predetermined set of engine auxiliary loads that is in the pending state.

8. An internal combustion engine speed control method for varying engine output torque through variation in the timing of combustion of an air-fuel mixture in engine cylinders to drive engine speed toward a target engine speed, comprising, for each of a series of sampling events, the steps of:

establishing a desired engine speed for a current sampling event;

establishing a desired engine speed for a future sampling event following the current sampling event;

determining actual engine speed at the current sampling event;

predicting engine speed at the future sampling event;

calculating current engine speed error as a difference between the desired engine speed for the current sampling event and the actual engine speed at the current sampling event;

calculating future engine speed error as a difference between the desired engine speed for the future sampling event and the predicted engine speed at the future sampling event;

predicting the value of a predetermined air pressure parameter at the future sampling event;

determining a minimum spark advance for best torque combustion timing command (MBT command) as a predetermined function of the predicted engine speed and of the predicted value;

calculating a combustion timing command as a predetermined function of current engine speed error, future engine speed error, and the MBT command; and controlling the timing of combustion of the air-fuel mixture in accord with the combustion timing command.

9. The method of claim 8, further comprising the steps of:

sensing a predetermined application condition for an engine accessory load;

referencing a stored ignition timing offset corresponding to the engine accessory load upon sensing the application condition; and adjusting the combustion timing command by the referenced timing offset; and wherein the controlling step controls the timing of combustion of the air-fuel mixture in accord with the adjusted combustion timing command.

10. The method of claim 8, further comprising the steps of:

generating a proportional compensation term as a product of predicted future engine speed error and a predetermined proportional gain;

generating an error differential representing the derivative of current engine speed error;

generating a derivative compensation term as a product of the error differential and a predetermined derivative gain;

and wherein the step of calculating a combustion timing command calculates the combustion timing command as a predetermined function of the derivative compensation term, the proportional compensation term, and the MBT command.

11. The method of claim 10, wherein the predetermined proportional gain is determined as a predetermined function of current and future engine speed error.

12. The method of claim 10, wherein the predetermined derivative gain is determined as a predetermined function of current and future engine speed error.

13. The method of claim 8, wherein the engine includes an intake manifold for receiving engine intake air, and wherein the predetermined air pressure parameter is engine intake manifold absolute air pressure.

* * * * *